Nov. 15, 1966     T. F. KARTIALA     3,285,120
PRELOAD BOLT JOINT
Filed April 30, 1965
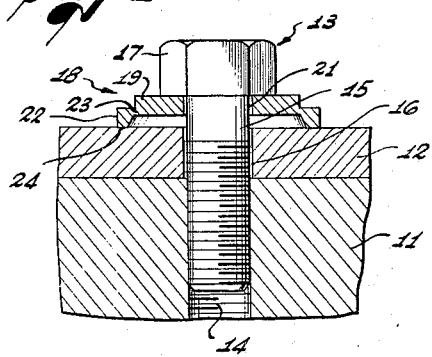
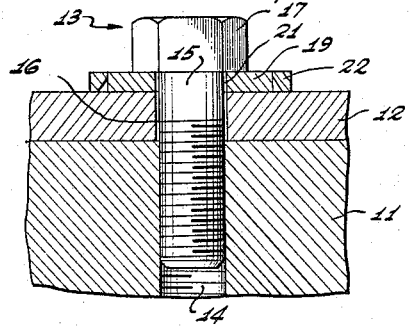
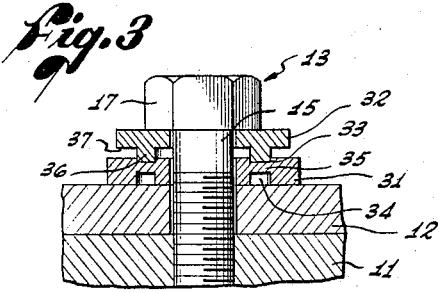
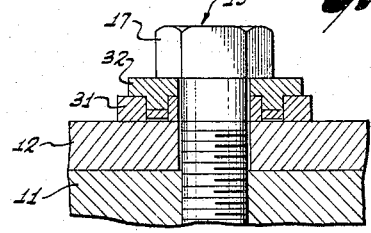
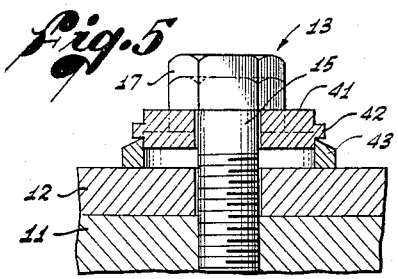
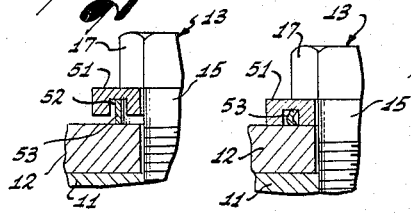
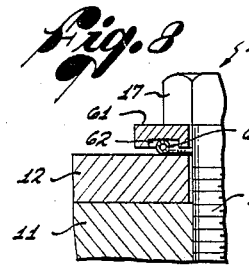
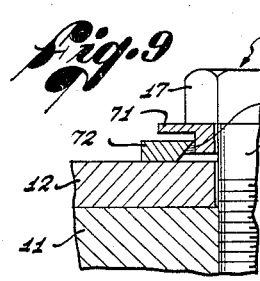
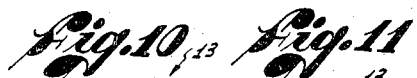
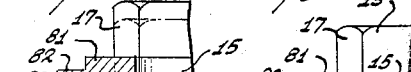
INVENTOR.
TAUNO F. KARTIALA
ATTORNEYS

United States Patent Office 3,285,120
Patented Nov. 15, 1966

3,285,120
PRELOAD BOLT JOINT
Tauno F. Kartiala, 15836 Lahey St., Granada Hills, Calif.
Filed Apr. 30, 1965, Ser. No. 453,566
8 Claims. (Cl. 85—62)

This application is a continuation of my copending application Serial No. 177,429, filed March 5, 1962, now abandoned, for Preload Washer and Method of Preloading a Joint Therewith. This invention relates generally to preloaded bolt joints and similar fastener constructions and to methods of applying a desired predetermined preloading to such joints.

In the setting of fasteners, such as bolts, it is desired to preload the fastener shank to a predetermined installation tension which shall obviate both loose connections and overly preloaded connections which might endanger the structural integrity of the joint and connected parts. Such preloading is now performed in several ways. One method is to calculate the torque value which, when applied to the bolt joint will develop a desired preload tension in the bolt shank. This torque is then applied to the bolt joint using a torque wrench which has a measuring device therein to determine the value of torque applied. Unfortunately, the preload tension resulting from such computation and the use of a torque wrench gives very poor accuracy because of the many variables which may be encountered, such as: variation of frictional resistance, allowable thread tolerances, surface conditions including materials and lubrication, parallelism of the nut, washer and fitting surfaces, temperature differences, and others, which inject considerable errors into the resulting preload tension. Another method includes the measurement of tension versus torque in a separate device, but this cannot be exactly duplicated in the actual joint. Also, various preload indicating washers have been tried, but these have required complex systems, and space or friction measuring devices and, where failure of washer parts has been utilized, the failed part remains a substantial portion of the joint and bears a substantial portion of the load.

According to the present invention, failure of material is used as a base of calibration to determine the torque to be applied to a joint to establish the desired preloading. Such failure of material may occur in shear, tension, compression, bending, buckling, etc., or any combination of these; and the material failure can be measured from its yield or ultimate points, as best suited to the particular washer structure used. A torque wrench may be used to load the joint to the material failure point, but the torque wrench is here used only as a reading device, and not as an absolute measure of the torque applied. The reading secured may be an arbitrary number which indicates the failure point, and the joint is tightened to this indicated point as a value calibrated by the failure of the material. The reading of the torque wrench therefore need not be an absolute, true reading of the torque applied, but is simply an indicating point calibrated by the failure of the material; and the joint is thereafter tightened to apply the same preload to the bolt as when the failure of material occurred. Depending on the washer arrangement used, the torque may drop down after such failure point is reached, in which case the bolt is then retightened to the failure point torque; or the joint may be loosened, a spacer-ring removed, and the bolt again tightened to the calibrated torque point.

In the joint and method according to the present invention, the material whose failure provides the calibrating point for the preloading torque preferably bears either no or a negligible part of the load on the bolt joint. There is therefore provided a primary, direct application of preload pressure from the fastener head through washer material which has not been stressed beyond its failure point.

It is, therefore, an object of the present invention to provide an improved joint employing a fastener or bolt which uses a calibrating washer having a failure point calibrating a preload tension to be developed in the bolt.

Another object of this invention is to provide an improved joint utilizing a washer providing a calibrating point for preloading the joint, in which material failure occurs and in which the failed material bears no or a negligible part of the joint loading.

A further object of this invention is an improved method of establishing a desired predetermined loading on a headed fastener, such as a bolt.

A still further object of this invention is the provision of a method of preloading a bolt joint by establishing a torque reference at which material failure occurs, and tightening the bolt to the calibrated torque value to set the desired preload on the bolt.

These and other objects and features of this invention will be readily apparent from the following description of certain presently preferred embodiments of the invention and the appended drawings illustrating the same, in which:

FIGURE 1 is a longitudinal sectional view through a bolt joint according to the present invention prior to loading;

FIGURE 2 is a view similar to FIGURE 1, but showing the joint completed with the desired preloading thereon;

FIGURE 3 is a view similar to FIGURE 1, but showing a modified form of preload calibrating washer according to the present invention;

FIGURE 4 is a view similar to FIGURE 3, showing the joint thereof set to the desired preload;

FIGURE 5 is a longitudinal sectional view of a bolt joint using another modified form of preload calibrating washer according to the present invention and showing the joint prior to loading;

FIGURE 6 is a partial longitudinal sectional view of a further modified form of preload calibrating washer in a bolt point prior to loading thereof;

FIGURE 7 is a partial view similar to FIGURE 6, showing the joint completed with the desired preload set thereon;

FIGURE 8 is a partial longitudinal sectional view showing a still further modified form of preload calibrating washer in a bolt joint;

FIGURE 9 is a partial longitudinal sectional view showing another modified form of preload calibrating washer according to the present invention in a bolt joint;

FIGURE 10 is a partial longitudinal sectional view showing yet another modified form of preload calibrating washer, as assembled, in full lines, and as stressed, in phantom; and FIGURE 11 is a view similar to FIGURE 10, but showing the completed joint.

Referring first to the form of the invention illustrated in FIGURES 1 and 2, the joint therein shown joins a pair of members 11 and 12 by means of a bolt 13. The member 11 has a threaded opening 14 therein in which is threaded the shank 15 of the bolt 13. The shank 15 extends freely through a clearance hole 16 through the member 12, and the upper end of the shank has a head 17 integral therewith. Between the under surface of the head 17 and the upper surface of the member 12 is disposed a preload calibrating washer 18. The washer 18 has a central disk-like portion 19 having a center hole 21 extending therethrough, through which extends the shank 15 of the bolt 13. To the outer edge of the center disk 19 is mounted a ring portion 22 by means of a reduced area connecting portion 23. The ring 22 includes an annular edge 24, originally spaced beneath the lower surface of the central disk portion 19 and in engagement with the top surface of the member 12. The apertured disk 19 and ring 22 may be viewed as concentric rings, axially offset from one another and integrally connected by a continuous wall of frangible material 23 which defines the smallest cross-section of the washer 18.

The parts are shown in FIGURE 1 as they are assembled and prior to loading of the bolt joint. The ring 22 is illustrated in FIGURE 1 as integral with the disk 19, but it is understood that it could be originally separate therefrom and be welded, brazed, soldered, or otherwise connected thereto. The strength of the material at 23, its thickness, and its distance from the axis of the bolt 13 will determine the loading on the bolt joint and the torque applied to the head 17 of the bolt at which failure of the material at 23 occurs. By the selection of material, its thickness and its radius from the axis of the bolt, the washer can be made to fail at any desired preload.

In calibrating the torque reading to be applied to the joint, the bolt is tightened until failure at the point 23 occurs. This can be at the yield or ultimate failure point of the material, the illustration of FIGURE 2 showing that in the type of washer of FIGURE 1 there is a complete failure in shear, with the ring 22 separated from the central disk portion 19. The value at which the material failure occurred is preferably noted upon a torque wrench, strain gauge, or similar device and, after failure, the bolt is retightened to the calibrated indication, at which point the desired preload will be applied to the joint.

It is to be noted that this calibrating point is not necessarily the true torque and is not used as an absolute value; but is simply an indication of the torque, whatever it may be, at which failure of the material 23 occurs, and it is this failure of material which determines the loading point to which the joint is returned after material failure.

An inspection of FIGURE 2 will show that the failed material at 23 no longer forms any part of the joint, and the ring 22 may be entirely removed from the resulting joint structure without any effect on the loading. The loading of the joint is effected directly from the bolt head 17 through the central disk portion 19 to the member 12, and the failed material is no longer in the loading train of joint elements.

The modified form of preload calibrating washer shown in FIGURES 3 and 4 is made up of two superimposed disks 31 and 32 which are disposed between the lower surface of the head 17 of bolt 13 and the upper surface of the member 12. The washer disk 31 is provided with a pair of opposed annular slots 33 and 34 separated by an annular web 35. The upper disk 32 of the washer is provided with a depending annular flange 36 of the same dimensions as the slots 33 and 34 and positioned within the former in the assembled position of the parts, as shown in FIGURE 3. When so assembled, the disks 31 and 32 are separated by a space 37, preferably less than the depth of the slot 34. In reloading the joint of FIGURE 3, the bolt 13 is tightened until the web 35 fails to shear. The torque at which this occurs is the calibrated torque to which the bolt and joint are reloaded after material failure to apply the desired preloading to the joint. After so preloaded, the parts assume the position of FIGURE 4, and it is to be noted that again the failed material is not in the train of force through the joint, this occurring directly from the head 17 through the disks 32 and 31 to the member 12.

The modification of the invention shown in FIGURE 5 employs a preload calibrating washer 41 having a peripheral flange 42 against which is disposed the cutting edge of an outer ring 43. The operation of the washer of FIGURE 5 will be obvious, the bolt 13 being tightened until the flange 42 fails in shear to give the calibrated torque reading. Thereafter, the bolt is tightened to this calibrated value, and the joint is complete with the failed material entirely out of the train of force, this being applied directly from the bolt head 17 through the washer 41 to the member 12.

In the form of the invention shown in FIGURES 6 and 7, the preload calibrating washer comprises a main force-absorbing disk 51 having an annular slot 52 therein in which is disposed a calibrating ring 53 having a height greater than the depth of the slot 52. In the form of the invention of FIGURES 6 and 7, when the bolt 13 is tightened the ring 53 fails in compression by buckling into the position of FIGURE 7. It is to be noted that the slot 52 is considerably wider than the ring 53, so that buckling occurs freely and, after failure, the buckled ring will transmit only negligible force therethrough, the direct loading force being from the head 17 of the bolt through the disk 51 to the member 12. If desired, the joint can be opened after the calibrated torque value is determined and the buckled ring 53 bodily removed and the joint reassembled. However, where the ring 53 may buckle freely, its presence is substantially immaterial as it absorbs no or negligible load.

In the form of the invention of FIGURE 8 the preload calibrating washer is shown as comprising a disk 61 having an annular slot 62 in its under surface. A hydraulic capsule 63 having a greater diameter than the depth of the slot 62 is disposed therein. As the bolt 13 is tightened, the hydraulic capsule 63 is collapsed to determine the calibrated torque to which the bolt 13 is retightened to establish the desired preloading on the joint. In the completed joint the force will be applied directly from the head 17 of the bolt through the disk 61 to the member 12, and the collapsed capsule forms no part of the force train.

In the modification of the invention shown in FIGURE 9, the calibrating washer is made up of a pair of members 71 and 72, of general ring-like form, joined together at 73, as by brazing or welding. As the bolt 13 is tightened, the connection at 73 will fail at the calibrated torque to which the bolt 13 is retightened to establish the desired predetermined loading on the bolt joint. As completed, the loading on the joint may be transmitted from the bolt head 17 through the washer part 71 directly to the member 12; or from the part 71 through the washer part 72 to the member 12, or both, depending on the dimensions of the parts. In any event, the failed material at 73 forms no part of the loading train in the finished joint.

In the form of the invention shown in FIGURES 10 and 11, the calibrating washer has a central, main force bearing portion 81 and an annual portion 82, of reduced thickness, extending outwardly therefrom in a substantially medial plane. A depending flange 83 is disposed at the peripheral edge of the portion 82. A removable, split washer 84 is disposed beneath the flange 83 and receives the force of initial tightening of the bolt 13 to fail the material of the annular portion 82 into the phantom position of FIGURE 10 to establish the calibrated torque value. Thereafter, the bolt 13 is loosened and the split washer 84 removed. The bolt 13 is then retightened to the calibrated torque, with the joint as shown in FIGURE 11, the failed material being entirely out of the train of force through the joint.

It will readily be understood that instead of taking a reading of a torque value at which material failure occurs, automatic torque-applying devices may be utilized which duplicate this calibrated torque in setting up the desired final preloading on the joint.

Since conditions at the measuring or calibrating point and at final tightening are the same, the preload calibrating washer and method according to the present invention will always give the desired preloading as determined by the calibrating failure point of the washer material; and since the final load on the joint is determined by returning the torque on the bolt to the calibrated value at which material failure occurred, the final loading will be independent of bolt tolerances, lubrication, dimensions, materials, parallelism of surfaces, temperature and other variables which might introduce error into a measured torque application. All that is required is that the failure point of the failing material of the preload calibrating washer be accurately determined. This failure point will depend upon the dimension, thickness and strength of the material, and can be accurately controlled. By determining this failure point in terms of torque loading, and returning the bolt joint to this calibrated torque loading, the variables which normally introduce errors into the preloading are substantially eliminated. It is further to be noted that once the failing material has served its calibrating function for the applied torque, it no longer forms any substantial part of the bolt joint and does not affect the loading thereon, substantially all the loading of the joint being effected directly from the bolt through the washer to the joint members independently of the failed material.

While certain preferred embodiments of my invention have been specifically illustrated and described, it will be understood that my invention is not limited thereto, as variations will be readily apparent to those skilled in the art, and the invention is to be given its broadest interpretation within the terms of the following claims.

I claim:
1. In combination in a joint to be preloaded to a predetermined value, a headed bolt, and a calibrating washer beneath the head of said bolt, said washer comprising: two concentric rings being axially offset from one another and being integrally connected by a continuous wall of frangible material defining the smallest cross-section of the washer, the head of said bolt engaging the smaller of the two rings with the maximum transverse dimension of the head being less than the outer diameter of said smaller ring.

2. In combination in a joint to be preloaded to a predetermined value, a headed fastener, and a calibrating washer beneath the head of said fastener, said washer comprising: a main force transmitting portion adapted to transmit the fastener load directly from the head of the fastener to the joint, and a material portion engaging said main portion and positioned relative to said main portion to bear the preliminary force exerted by said fastener head upon initial tightening of the fastener, said material portion being constructed to fail at a predetermined value of force exerted by said fastener head to provide a calibrating arbitrary measurement of the torque applied to said fastener head at the time said material failure occurs, so that the application of this calibrated value of torque to the fastener head ultimately will tighten the fastener to apply a desired predetermined loading to the joint, said material portion carrying substantially no load in the completed and preloaded joint.

3. The combination defined in claim 2 in which said material portion is substantially integral with said main portion and is sheared therefrom to establish a calibrated value for the preload torque, and is thereafter out of the direct train of force application between the fastener head and the joint members.

4. The combination defined in claim 2 in which said failure portion buckles freely in compression to give the calibrating torque measurement for preloading the joint so that the failure portion after buckling carries no substantial part of the principal load on the joint.

5. The combination defined in claim 2 in which said main force-transmitting portion comprises a central disk; and an outer ring offset axially from the disk and integrally connected thereto by said material portion for failure at the point of connection between said disk and ring.

6. The combination of claim 2 in which said calibrating washer is formed of two elements disposed in superposed relation and movable toward each other by displacement of the material of one of the parts and in which the displaced part carries substantially no appreciable part of the final loading on the joint.

7. The combination defined in claim 4 in which said buckled part comprises a hydraulic capsule which bursts to establish the calibrated torque value for preloading.

8. In combination in a joint to be preloaded to a predetermined value, a headed bolt, and a calibrating washer beneath the head of said bolt, said washer comprising: two concentric rings being axially offset from one another and being integrally connected by a continuous wall of frangible material defining the smallest cross-section of the washer, the head of said bolt engaging the smaller of the two rings and operating when tightened to fail said frangible material to give a calibrating arbitrary measurement of torque at the point of failure.

References Cited by the Examiner

UNITED STATES PATENTS

| | | | |
|---|---|---|---|
| 1,127,849 | 2/1915 | Barnes | 85—61 |
| 1,311,473 | 7/1919 | Vossler | 85—50 |
| 1,324,036 | 12/1919 | De Laval | 85—50 |
| 1,532,856 | 4/1925 | Andren et al. | 85—50 |
| 2,380,994 | 8/1945 | Pummill | 151—19 |
| 3,004,776 | 10/1961 | Sebardt | 285—3 |
| 3,169,786 | 2/1965 | Cator | 285—3 |
| 3,174,386 | 3/1965 | Lewis | 85—62 |

FOREIGN PATENTS

| | | |
|---|---|---|
| 33,309 | 4/1928 | France. |
| 797,729 | 7/1958 | Great Britain. |

CARL W. TOMLIN, *Primary Examiner.*

R. S. BRITTS, *Assistant Examiner.*